(12) United States Patent
Davydov et al.

(10) Patent No.: US 8,747,657 B2
(45) Date of Patent: Jun. 10, 2014

(54) PROCESS AND APPARATUS FOR MIXING TWO STREAMS OF CATALYST

(75) Inventors: Lev Davydov, Northbrook, IL (US);
Lisa M. Wolschlag, Aurora, IL (US);
Paolo Palmas, Des Plaines, IL (US);
Robert L. Mehlberg, Wheaton, IL (US);
Mohammad-Reza Mostofi-Ashtiani, Naperville, IL (US); Daniel R. Johnson, Schaumburg, IL (US); Chad R. Huovie, Park Ridge, IL (US); Michael S. Sandacz, Glen Ellyn, IL (US); Peter J. Van Opdorp, Naperville, IL (US);
Thomas W. Lorsbach, Austin, TX (US);
Karthikeyan Paramanandam, Bangalore (IN)

(73) Assignee: UOP LLC, Des Plaines, IL (US)

( * ) Notice: Subject to any disclaimer, the term of this patent is extended or adjusted under 35 U.S.C. 154(b) by 58 days.

(21) Appl. No.: 13/323,053

(22) Filed: Dec. 12, 2011

(65) Prior Publication Data
US 2013/0148463 A1 Jun. 13, 2013

(51) Int. Cl.
*C10G 11/00* (2006.01)
*C10G 9/00* (2006.01)

(52) U.S. Cl.
USPC .......................................... 208/113; 208/106

(58) Field of Classification Search
USPC .......... 366/167.1, 173.1, 173.2, 174.1, 175.2; 208/113
See application file for complete search history.

(56) References Cited

U.S. PATENT DOCUMENTS

| | | | |
|---|---|---|---|
| 2,902,432 A * | 9/1959 | Codet | 208/113 |
| 3,677,715 A | 7/1972 | Morrison et al. | |
| 3,801,009 A | 4/1974 | Marshall, III | |
| 3,881,656 A | 5/1975 | Markfelt et al. | |
| 3,888,762 A | 6/1975 | Gerhold | |
| 3,896,026 A | 7/1975 | MacLean et al. | |
| 4,026,821 A | 5/1977 | Schoofs et al. | |
| 4,283,273 A | 8/1981 | Owen | |
| 4,309,308 A * | 1/1982 | Vickers | 208/113 |
| 4,417,974 A | 11/1983 | Haunschild | |
| 4,564,502 A | 1/1986 | Skraba | |
| 4,572,780 A | 2/1986 | Owen et al. | |
| 4,605,491 A | 8/1986 | Haddad et al. | |
| 4,793,915 A | 12/1988 | Haddad et al. | |
| 5,017,343 A | 5/1991 | Cetinkaya | |
| 5,062,945 A | 11/1991 | Pappal et al. | |
| 5,098,553 A | 3/1992 | Sapre | |
| 5,143,874 A * | 9/1992 | Ross | 208/113 |

(Continued)

FOREIGN PATENT DOCUMENTS

| | | |
|---|---|---|
| GB | 862961 A | 4/1957 |
| WO | 9301257 A1 | 1/1993 |
| WO | 2008119499 A1 | 10/2008 |

OTHER PUBLICATIONS

U.S. Appl. No. 13/424,713, filed Mar. 20, 2012, Palmas.

(Continued)

*Primary Examiner* — Tony G Soohoo
*Assistant Examiner* — Anshu Bhatia
(74) *Attorney, Agent, or Firm* — James C Paschall

(57) ABSTRACT

A process and apparatus for mixing streams of regenerated and carbonized catalyst involves passing a catalyst stream into and out of a chamber in a lower section of a riser. The chamber fosters mixing of the catalyst streams to reduce their temperature differential before contacting hydrocarbon feed.

19 Claims, 8 Drawing Sheets

(56) References Cited

U.S. PATENT DOCUMENTS

| | | |
|---|---|---|
| 5,176,815 A | 1/1993 | Lomas |
| 5,194,227 A | 3/1993 | Miller et al. |
| 5,205,993 A | 4/1993 | Leib et al. |
| 5,288,397 A | 2/1994 | Markham et al. |
| 5,310,477 A | 5/1994 | Lomas |
| 5,318,691 A | 6/1994 | Muldowney |
| 5,346,613 A | 9/1994 | Lomas et al. |
| 5,451,313 A | 9/1995 | Wegerer et al. |
| 5,462,652 A | 10/1995 | Wegerer |
| 5,489,154 A | 2/1996 | Algreen-Ussing |
| 5,514,271 A | 5/1996 | Buchanan et al. |
| 5,597,537 A | 1/1997 | Wegerer et al. |
| 5,840,254 A | 11/1998 | Carver, Jr. et al. |
| 5,858,207 A | 1/1999 | Lomas |
| 5,869,771 A | 2/1999 | Rajan et al. |
| 5,910,240 A | 6/1999 | Senior et al. |
| 5,944,982 A | 8/1999 | Lomas |
| 5,965,012 A | 10/1999 | Lomas |
| 6,010,618 A | 1/2000 | Lomas |
| 6,183,699 B1 | 2/2001 | Lomas |
| 6,238,548 B1 | 5/2001 | Upson et al. |
| 6,491,875 B1 | 12/2002 | Palmas |
| 6,538,169 B1 | 3/2003 | Pittman et al. |
| 6,616,899 B1 | 9/2003 | Upson |
| 6,616,900 B1 | 9/2003 | Lomas |
| 6,835,302 B2 | 12/2004 | Cammy et al. |
| 6,866,771 B2 | 3/2005 | Lomas et al. |
| 6,869,521 B2 | 3/2005 | Lomas |
| 6,902,593 B2 | 6/2005 | Miller et al. |
| 7,011,740 B2 | 3/2006 | Tallman et al. |
| 7,293,909 B2 | 11/2007 | Taniguchi |
| 7,435,331 B2 | 10/2008 | Peterson et al. |
| 7,674,439 B2 | 3/2010 | Jacobs et al. |
| 7,935,314 B2 | 5/2011 | Couch et al. |
| 8,025,717 B2 | 9/2011 | Dries et al. |
| 2003/0040105 A1 | 2/2003 | Sklar et al. |
| 2003/0116471 A1 | 6/2003 | Zhang et al. |
| 2008/0152552 A1 | 6/2008 | Hedrick et al. |
| 2009/0148360 A1 | 6/2009 | Hedrick et al. |
| 2010/0078357 A1 | 4/2010 | Couch et al. |
| 2010/0080741 A1 | 4/2010 | Couch et al. |
| 2011/0016856 A1 | 1/2011 | Wirth |
| 2012/0141333 A1* | 6/2012 | Ulas Acikgoz et al. .... 196/14.52 |

OTHER PUBLICATIONS

U.S. Appl. No. 13/424,743, filed Mar. 20, 2012, Palmas.
U.S. Appl. No. 13/424,796, filed Mar. 20, 2012, Johnson.
U.S. Appl. No. 13/424,820, filed Mar. 20, 2012, Johnson.
U.S. Appl. No. 13/323,129, filed Dec. 12, 2011, Davydov et al.
U.S. Appl. No. 13/323,217, filed Dec. 12, 2011, Wolschlag et al.
U.S. Appl. No. 13/323,249, filed Dec. 12, 2011, Wolschlag et al.

* cited by examiner

US 8,747,657 B2

PROCESS AND APPARATUS FOR MIXING TWO STREAMS OF CATALYST

BACKGROUND OF THE INVENTION

The invention relates to a process and apparatus for mixing carbonized and regenerated catalyst. A field of the invention may be the field of fluid catalytic cracking (FCC).

FCC is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds substantial amounts of highly carbonaceous material referred to as coke are deposited on the catalyst to provide coked or carbonized catalyst. This carbonized catalyst is often referred to as spent catalyst. However, this term may be misconstrued because the carbonized catalyst still has significant catalytic activity. Vaporous products are separated from carbonized catalyst in a reactor vessel. Carbonized catalyst may be subjected to stripping over an inert gas such as steam to strip entrained hydrocarbonaceous gases from the carbonized catalyst. A high temperature regeneration with oxygen within a regeneration zone burns coke from the carbonized catalyst which may have been stripped.

Although the carbonized catalyst carries coke deposits it may still have activity. U.S. Pat. No. 3,888,762 discloses mixing carbonized and regenerated catalyst for contact with the hydrocarbon feed. The regenerated catalyst may be in the range of 593° to 760° C. (1100° to 1400° F.) and the carbonized catalyst may be in the range of 482° to 621° C. (900° to 1150° F.). U.S. Pat. No. 5,597,537 discloses mixing the carbonized and regenerated catalyst in a blending vessel to allow the regenerated and carbonized catalyst to reach a temperature equilibrium before contacting the hydrocarbon feed. U.S. Pat. No. 7,935,314 B2 discloses baffles in the riser to obstruct upward catalyst flow to foster mixing. A mixed catalyst with more uniform temperature avoids hot spots that can generate nonselective cracking to reduce the value of the product hydrocarbons.

Improved apparatus and processes are sought in the mixing of carbonized and regenerated catalyst.

SUMMARY OF THE INVENTION

We have found that the mixing chamber for process units that are designed to process large amounts of feed can become very large which adds to the capital cost and requires more catalyst inventory to fill the increased volume added by the chamber to an entire process unit. However, we have discovered that carbonized and regenerated catalyst can be thoroughly mixed in the lower section of a reactor riser by use of a chamber in a lower section of the riser.

In an apparatus embodiment, the present invention comprises an apparatus for mixing two streams of catalyst comprising a riser. A first catalyst conduit and a second catalyst conduit are in communication with the riser. A chamber in the riser is in communication with the first catalyst conduit. Lastly, a wall of the chamber is spaced apart from a wall of the riser.

In an additional apparatus embodiment, the present invention comprises an apparatus for mixing two streams of catalyst comprising a riser. A first catalyst conduit and a second catalyst conduit are in communication with the riser. A chamber in the riser is in communication with the first catalyst conduit. Lastly, an opening in a wall of the chamber is spaced apart from the wall of the riser.

In a further apparatus embodiment, the present invention comprises an apparatus for mixing two streams of catalyst comprising a riser. A first catalyst conduit and a second catalyst conduit are in communication with the riser. A chamber in the riser is in communication with the first catalyst conduit. A wall of the chamber is spaced apart from a wall of the riser. Lastly, the chamber only communicates with the first catalyst conduit.

In a process embodiment, the present invention comprises a process for mixing two streams of catalyst comprising feeding a first stream of catalyst to a chamber. A second stream of catalyst is fed to a riser. Catalyst is passed from the chamber into the riser. Lastly, the first stream of catalyst and the second stream of catalyst are passed up the riser.

In an additional process embodiment, the present invention comprises a process for mixing two streams of catalyst comprising passing a first stream of catalyst upwardly from a first catalyst conduit into a chamber and feeding a second stream of catalyst to a space between a wall of the riser and a wall of the chamber. Catalyst is passed from the chamber into the riser. Lastly, the first stream of catalyst and the second stream of catalyst are passed up the riser.

In a further process embodiment, the present invention comprises a process for mixing two streams of catalyst comprising feeding a first stream of catalyst to a chamber. A second stream of catalyst is fed to a space between a wall of the riser and a wall of the chamber. The first stream of catalyst is fed from the chamber into the space. Lastly, the first stream of catalyst and the second stream of catalyst are passed up the riser.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through an intermediate vessel.

The term "feeding" means that the feed passes from a conduit or vessel directly to an object without passing through an intermediate vessel.

The term "passing" includes "feeding" and means that the material passes from a conduit or vessel to an object.

DETAILED DESCRIPTION OF THE INVENTION

Figure 1:
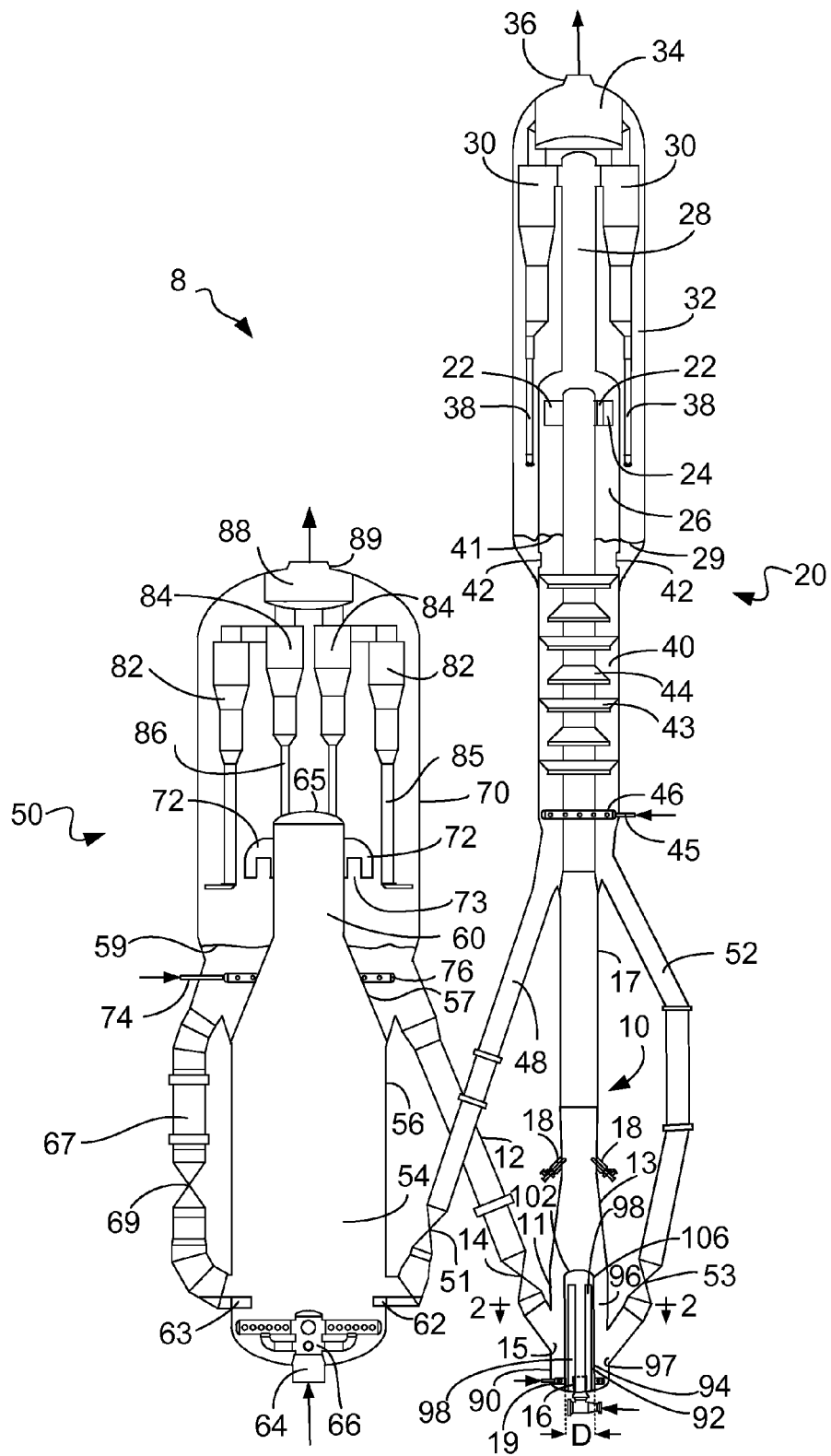
FIG. 1 is a schematic, elevational view of an FCC unit incorporating the present invention.

The apparatus and process of the present invention is for mixing regenerated catalyst and carbonized catalyst for contact with a hydrocarbon feed. The present invention may be useful in any solids-gas contacting equipment. However, ready usefulness is found in an FCC unit. FIG. 1 shows an FCC unit 8 that includes a reactor vessel 20 and a regenerator vessel 50. A first regenerated catalyst conduit 12 transfers a first regenerated catalyst stream from the regenerator vessel 50 at a rate regulated by a control valve 14 through a regenerated catalyst inlet 15 of the first regenerated catalyst conduit 12 to the reactor riser 10. A second carbonized catalyst conduit 52 transfers a second carbonized catalyst stream from the reactor vessel 20 at a rate regulated by a control valve 53 through a carbonized catalyst inlet 97 of the second carbonized catalyst conduit 52 to the reactor riser 10.

The riser 10 is an elongated vertical tube typically made of carbon steel. The riser 10 may comprise an enlarged lower section 11 and a narrower upper section 17. The enlarged lower section 11 may have a larger diameter than the narrower upper section 17 of the riser. The enlarged lower section 11 may include a hemispherical bottom. The enlarged lower section 11 may include a frustoconical transition section 13 that tapers between the enlarged diameter of the enlarged lower section and the narrowed diameter of the upper section 17 of the riser. The first regenerated catalyst conduit 12 and a second carbonized catalyst conduit 52 may connect to the lower section 11 at a wall 90 of the lower section at inlets 15 and 97, respectively. In an aspect, one or both of the first regenerated catalyst conduit and the second carbonized catalyst conduit do not extend into the riser 10 past the wall 90 of the enlarged lower section 11. The inner surface of the entire riser 10 may be coated with a refractory material.

A fluidization medium such as steam from a nozzle 16 and ring 19 in the lower section 11 urges catalyst upwardly through the riser 10 at a relatively high density. A plurality of feed distributors 18 in the upper section 17 of the riser 10 just above the transition section 13 inject feed across the flowing stream of catalyst particles to distribute hydrocarbon feed to the riser 10. Upon contacting the hydrocarbon feed with catalyst in the reactor riser 10 the heavier hydrocarbon feed cracks to produce lighter gaseous hydrocarbon product while coke is deposited on the catalyst particles to produce carbonized catalyst.

A conventional FCC feedstock and higher boiling hydrocarbon feedstock are suitable feeds. The most common of such conventional feedstocks is a "vacuum gas oil" (VGO), which is typically a hydrocarbon material having a boiling range of from 343° to 552° C. (650 to 1025° F.) prepared by vacuum fractionation of atmospheric residue. Such a fraction is generally low in coke precursors and heavy metal contamination which can serve to contaminate catalyst. Heavy hydrocarbon feedstocks to which this invention may be applied include heavy bottoms from crude oil, heavy bitumen crude oil, shale oil, tar sand extract, deasphalted residue, products from coal liquefaction, atmospheric and vacuum reduced crudes. Heavy feedstocks for this invention also include mixtures of the above hydrocarbons and the foregoing list is not comprehensive. It is also contemplated that lighter recycle or previously cracked feeds such as naphtha may be a suitable feedstock.

The reactor vessel 20 is in downstream communication with the riser 10. In the reactor vessel, the carbonized catalyst and the gaseous product are separated. The resulting mixture of gaseous product hydrocarbons and carbonized catalyst continues upwardly through the riser 10 into the reactor vessel 20 in which the carbonized catalyst and gaseous product are separated. A pair of disengaging arms 22 may tangentially and horizontally discharge the mixture of gas and catalyst from a top of the riser 10 through one or more outlet ports 24 (only one is shown) into a disengaging vessel 26 to effect partial separation of gases from the catalyst. Two, three or four disengaging arms 22 may be used depending on the size of the FCC unit.

A transport conduit 28 carries the hydrocarbon vapors, including stripped hydrocarbons, stripping media and entrained catalyst to one or more cyclones 30 in the reactor vessel 20 which separates carbonized catalyst from the hydrocarbon gaseous stream. The disengaging vessel 26 is partially disposed in the reactor vessel 20 and can be considered part of the reactor vessel 20. A collection plenum 34 in the reactor vessel 20 gathers the separated hydrocarbon gaseous streams from the cyclones 30 for passage to an outlet nozzle 36 and eventually into a fractionation recovery zone (not shown). Diplegs 38 discharge catalyst from the cyclones 30 into a lower bed 29 in the reactor vessel 20. The catalyst with adsorbed or entrained hydrocarbons may eventually pass from the lower bed 29 into an optional stripping section 40 across ports 42 defined in a wall of the disengaging vessel 26. Catalyst separated in the disengaging vessel 26 may pass directly into the optional stripping section 40 via a bed 41. A fluidizing conduit 45 delivers inert fluidizing gas, typically steam, to the stripping section 40 through a fluidizing distributor 46. The stripping section 40 contains baffles 43, 44 or other equipment to promote contacting between a stripping gas and the catalyst. The stripped carbonized catalyst leaves the stripping section 40 of the disengaging vessel 26 of the reactor vessel 20 with a lower concentration of entrained or adsorbed hydrocarbons than it had when it entered or if it had not been subjected to stripping. A first portion of the carbonized catalyst leaves the disengaging vessel 26 of the reactor vessel 20 through a spent catalyst conduit 48 and feeds into the regenerator vessel 50 at a rate regulated by a control valve 51. A second portion of the carbonized catalyst that has been coked in the reactor riser 10 leaves the disengaging vessel 26 of the reactor vessel 20 and is fed through the second carbonized catalyst conduit 52 back to the riser 10 at a rate regulated by a control valve 53. The second carbonized catalyst conduit 52 is in downstream communication with the reactor vessel 20. The second carbonized catalyst conduit 52 is in downstream communication with the outlet port 24 of the riser 10 and in upstream communication with a carbonized catalyst inlet 97 of the second carbonized catalyst conduit 52 to the riser 10.

The riser 10 of the FCC process is maintained at high temperature conditions which generally include a temperature above about 425° C. (797° F.). In an embodiment, the reaction zone is maintained at cracking conditions which include a temperature of from about 480° to about 621° C. (896° to 1150° F.) at the riser outlet port 24 and a pressure from about 69 to about 517 kPa (ga) (10 to 75 psig) but typically less than about 275 kPa (ga) (40 psig). The catalyst-to-oil ratio, based on the weight of catalyst and feed hydrocarbons entering the bottom of the riser, may range up to 30:1 but is typically between about 4:1 and about 10:1 and may range between 7:1 and 25:1. Hydrogen is not normally added to the riser, although hydrogen addition is known in the art. Steam may be passed into the riser 10 and reactor vessel 20 equivalent to about 2-35 wt-% of feed. Typically, however, the steam rate will be between about 2 and about 7 wt-% for maximum gasoline production and about 10 to about 20 wt-% for maximum light olefin production. The average residence time of catalyst in the riser may be less than about 5 seconds. The type of catalyst employed in the process may be chosen from a variety of commercially available catalysts. A catalyst comprising a zeolitic material such as Y Zeolite is preferred, but the older style amorphous catalysts can be used if desired. Additionally, shape-selective additives such as ZSM-5 may be included in the catalyst composition to increase light olefin production.

The regenerator vessel 50 is in downstream communication with the reactor vessel 20. In the regenerator vessel 50, coke is combusted from the portion of carbonized catalyst delivered to the regenerator vessel 50 by contact with an oxygen-containing gas such as air to provide regenerated catalyst. The regenerator vessel 50 may be a combustor type of regenerator, which may use hybrid turbulent bed-fast fluidized conditions in a high-efficiency regenerator vessel 50 for completely regenerating carbonized catalyst. However, other regenerator vessels and other flow conditions may be suitable for the present invention. The spent catalyst conduit 48 feeds carbonized catalyst to a first or lower chamber 54 defined by outer wall 56 through a spent catalyst inlet chute 62. The carbonized catalyst from the reactor vessel 20 usually contains carbon in an amount of from 0.2 to 2 wt-%, which is present in the form of coke. Although coke is primarily composed of carbon, it may contain from 3 to 12 wt-% hydrogen as well as sulfur and other materials. An oxygen-containing combustion gas, typically air, enters the lower chamber 54 of the regenerator vessel 50 through a conduit 64 and is distributed by a distributor 66. As the combustion gas enters the lower chamber 54, it contacts carbonized catalyst entering from chute 62 and lifts the catalyst at a superficial velocity of combustion gas in the lower chamber 54 of perhaps at least 1.1 m/s (3.5 ft/s). In an embodiment, the lower chamber 54 may have a catalyst density of from 48 to 320 kg/m$^3$ (3 to 20 lb/ft$^3$) and a superficial gas velocity of 1.1 to 6.1 m/s (3.5 to 20 ft/s). The oxygen in the combustion gas contacts the carbonized catalyst and combusts carbonaceous deposits from the catalyst to at least partially regenerate the catalyst and generate flue gas.

In an embodiment, to accelerate combustion of the coke in the lower chamber 54, hot regenerated catalyst from a dense catalyst bed 59 in an upper or second chamber 70 may be recirculated into the lower chamber 54 via an external recycle catalyst conduit 67 regulated by a control valve 69. Hot regenerated catalyst enters the lower chamber 54 through an inlet chute 63. Recirculation of regenerated catalyst, by mixing hot catalyst from the dense catalyst bed 59 with relatively cooler carbonized catalyst from the spent catalyst conduit 48 entering the lower chamber 54, raises the overall temperature of the catalyst and gas mixture in the lower chamber 54.

The mixture of catalyst and combustion gas in the lower chamber 54 ascend through a frustoconical transition section 57 to the transport, riser section 60 of the lower chamber 54. The riser section 60 defines a tube which is preferably cylindrical and extends preferably upwardly from the lower chamber 54. The mixture of catalyst and gas travels at a higher superficial gas velocity than in the lower chamber 54. The increased gas velocity is due to the reduced cross-sectional area of the riser section 60 relative to the cross-sectional area of the lower chamber 54 below the transition section 57. Hence, the superficial gas velocity may usually exceed about 2.2 m/s (7 ft/s). The riser section 60 may have a lower catalyst density of less than about 80 kg/m$^3$ (5 lb/ft$^3$).

The regenerator vessel 50 also includes an upper or second chamber 70. The mixture of catalyst particles and flue gas is discharged from an upper portion of the riser section 60 into the upper chamber 70. Substantially completely regenerated catalyst may exit the top of the transport, riser section 60, but arrangements in which partially regenerated catalyst exits from the lower chamber 54 are also contemplated. Discharge is effected through a disengaging device 72 that separates a majority of the regenerated catalyst from the flue gas. In an embodiment, catalyst and gas flowing up the riser section 60 impact a top elliptical cap 65 of the riser section 60 and reverse flow. The catalyst and gas then exit through downwardly directed discharge outlets 73 of disengaging device 72. The sudden loss of momentum and downward flow reversal cause a majority of the heavier catalyst to fall to the dense catalyst bed 59 and the lighter flue gas and a minor portion of the catalyst still entrained therein to ascend upwardly in the upper chamber 70. Cyclones 82, 84 further separate catalyst from ascending gas and deposits catalyst through dip legs 85, 86 into dense catalyst bed 59. Flue gas exits the cyclones 82, 84 and collects in a plenum 88 for passage to an outlet nozzle 89 of regenerator vessel 50 and perhaps into a flue gas or power recovery system (not shown). Catalyst densities in the dense catalyst bed 59 are typically kept within a range of from about 640 to about 960 kg/m$^3$ (40 to 60 lb/ft$^3$). A fluidizing conduit 74 delivers fluidizing gas, typically air, to the dense catalyst bed 59 through a fluidizing distributor 76. In a combustor-style regenerator, approximately no more than 2% of the total gas requirements within the process enter the dense catalyst bed 59 through the fluidizing distributor 76. In this embodiment, gas is added here not for combustion purposes but only for fluidizing purposes, so the catalyst will fluidly exit through the catalyst conduits 67 and 12. The fluidizing gas added through the fluidizing distributor 76 may be combustion gas. In the case where partial combustion is effected in the lower chamber 54, greater amounts of combustion gas will be fed to the upper chamber 70 through fluidizing conduit 74.

From about 10 to 30 wt-% of the catalyst discharged from the lower chamber 54 is present in the gases above the outlets 73 from the riser section 60 and enter the cyclones 82, 84. The regenerator vessel 50 may typically require 14 kg of air per kg of coke removed to obtain complete regeneration. When more catalyst is regenerated, greater amounts of feed may be processed in a conventional reactor riser. The regenerator vessel 50 typically has a temperature of about 594 to about 732° C. (1100 to 1350° F.) in the lower chamber 54 and about 649 to about 760° C. (1200 to 1400° F.) in the upper chamber 70. The regenerated catalyst conduit 12 is in downstream communication with the regenerator vessel 50 and communicates with the riser 10. Regenerated catalyst from dense catalyst bed 59 is transported through regenerated catalyst conduit 12 as a first stream of catalyst from the regenerator vessel 50 back to the reactor riser 10 through the control valve 14 where it again contacts feed as the FCC process continues. The carbonized catalyst in conduit 52 comprises a second stream of catalyst.

The first stream of regenerated catalyst and a second stream of carbonized catalyst fed into the riser 10 tend not to mix thoroughly before contacting the hydrocarbon feed. Accordingly, the feed can encounter catalyst at varying temperatures resulting in non-selective cracking to a composition with relatively more undesirable products. In an aspect, to ensure mixing between the carbonized catalyst and the regenerated catalyst, means is necessary in the lower end 11 of the riser 10 to facilitate catalyst mixing.

In an embodiment shown in FIG. 1, the first regenerated catalyst conduit 12 and the second carbonized catalyst conduit 52 connect to and are in communication with the riser 10. The first stream of regenerated catalyst in the first regenerated catalyst conduit 12 and the second stream of carbonized catalyst in the second carbonized catalyst conduit 52 are fed to the riser 10 and mixed together. One or both of the first regenerated catalyst conduit 12 and the second carbonized catalyst conduit 52 may tangentially connect to the enlarged lower section 11 of the riser 10 tangentially to impart an angular motion to catalyst discharged into the riser to promote mixing therein. Additionally, ramps may be installed at the connection between one or both of the first regenerated catalyst conduit 12 and the second carbonized catalyst conduit 52 and the enlarged lower section 11 of the riser 10 also to promote mixing in the enlarged lower section 11. After mixing, a mixture of the first stream of regenerated catalyst and the second stream of carbonized catalyst pass upwardly in the riser 10.

The riser may include a chamber 92. In an aspect, the enlarged lower section 11 of the riser 10 may include the chamber 92. In an aspect, the chamber 92 is contained in the enlarged lower section 11 of the riser. The chamber 92 in the riser 10 may be in downstream communication with the first catalyst conduit 12. The chamber 92 in the riser 10 may also be in downstream communication with the second catalyst conduit 52. The chamber 92 may have an outer wall 94 that is spaced apart from an inner surface of the wall 90 of the enlarged lower section 11 of the riser 10. In an aspect, the chamber 92 is radially centered in the enlarged lower section 11 of the riser 10. In other words, although not shown, the chamber 92 has a central longitudinal axis aligned with a central longitudinal axis of the riser. In a further aspect, the outer wall 94 of the chamber is a vertical wall.

The wall 94 of the chamber 92 and the wall 90 of the riser define a space 96 therebetween. In an aspect, chamber 92 and the enlarged lower section 11 may each comprise a cylinder that together they define an annular space 96 between the wall 94 of the chamber 92 and the wall 90 of the enlarged lower section 11. The first regenerated catalyst conduit 12 and the second carbonized catalyst conduit 52 may communicate with the space 96, so the first regenerated catalyst conduit 12 feeds the first stream of regenerated catalyst to the space 96 and the second carbonized catalyst conduit 52 feeds the second stream of carbonized catalyst to the space 96. The catalyst in the space 96 is fluidized by fluidizing gas from fluidizing distributor 19.

The chamber 92 may include at least one opening 98 in the wall 94 located in the space 96. The opening 98 may be spaced apart from the wall 90 of the riser 10. The opening 98 may serve as an entrance to an interior of the chamber 92. The chamber 92 may be in communication with the first regenerated catalyst conduit 12 and the second carbonized catalyst conduit 52, so at least a portion of the first stream of regenerated catalyst and at least a portion of the second stream of carbonized catalyst may pass from the space 96 into the chamber 92 through the opening 98 in the chamber. In an aspect, an upper most portion of the opening 98 may be at an elevation above a lower most portion, and preferably an upper most portion, of the inlet 97. In a further aspect, an upper most portion of the opening 98 may be at an elevation above a lower most, and preferably an upper most portion, of the inlet 15. Hence, the first stream of regenerated catalyst may pass upwardly from the inlet 15 of the first catalyst conduit 12, and the second stream of carbonized catalyst may pass upwardly from the inlet 97 of the second catalyst conduit 52 through the opening 98 into the chamber 92 through the space 96 between the wall 90 of the riser 10 and the wall 94 of the chamber 92.

In an aspect, the at least one opening 98 in the wall 94 of the chamber may serve as an exit from the chamber 92. Consequently, the first stream of regenerated catalyst and the second stream of carbonized catalyst may pass through the opening 98 from the chamber 92 into the space 96. By virtue of the first and second catalyst streams entering into and exiting from the chamber 92 through the at least one opening 98 in the wall 94 of the chamber 92, the catalyst streams mix together to provide a mixed stream of catalyst with a more-homogeneous temperature throughout the mixed stream of catalyst. The first and second catalyst streams pass from the chamber into the riser and pass upwardly from the enlarged lower section 11 and are contacted with feed from feed distributors 18 in the upper section 17 of the riser 10.

One or a plurality of openings 98 may be provided in the wall 94. At least one opening 98 may have an elongated configuration that is spaced from the top of the chamber 92.

Figure 2:
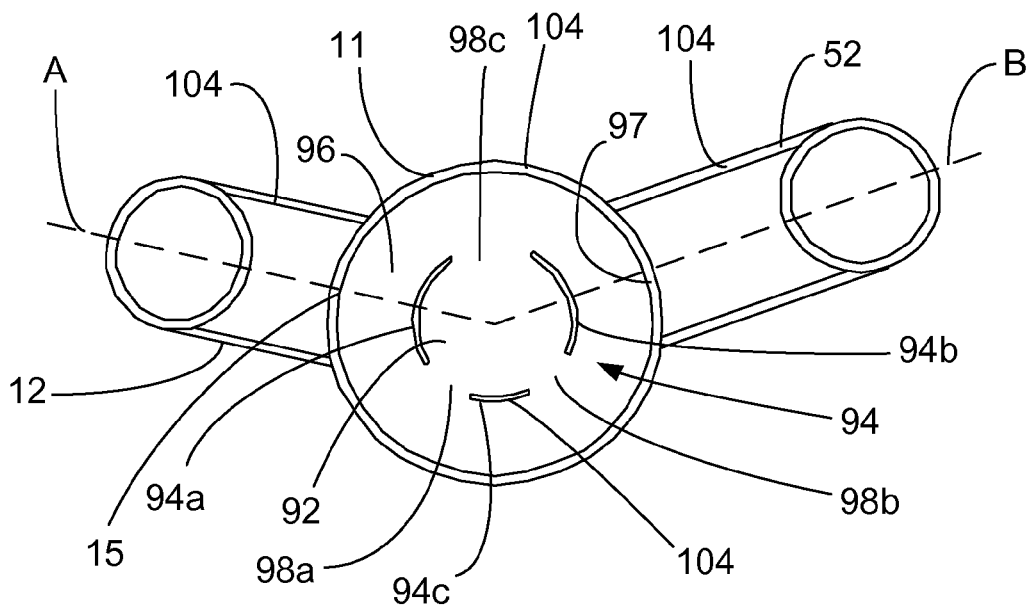
FIG. 2 is a sectional view of FIG. 1 taken at segment 2-2.

FIG. 2 shows a plan sectional view of segment 2-2 taken in FIG. 1. Refractory lining 104 on the wall 94 of the chamber 92 and the walls of the lower section 11 of the riser, the first regenerated catalyst conduit 12 and the second carbonized catalyst conduit 52 are shown in FIG. 2, but not in FIG. 1. The wall 94 of the chamber 92 comprises three arcuate sections 94a-c that define three openings 98a-c. Two openings 98a and 98b may have a smaller width than a third opening 98c. In an aspect, the two smaller openings 98a and 98b have the same arcuate width. Arcuate section 94a opposes the nearest catalyst conduit which is the first regenerated catalyst conduit 12 and particularly the inlet 15 thereof. Arcuate section 94b also opposes the nearest catalyst conduit which is the second carbonized catalyst conduit 52 and particularly the inlet 97 thereof. The third arcuate section 94c is optional. Dashed lines show central longitudinal axis A of the first regenerated catalyst conduit into the riser 10 and central longitudinal axis B of the second carbonized catalyst conduit 52 into the riser. The openings 98 are all radially unaligned with a longitudinal axis A, B of a nearest one of the first regenerated catalyst conduit 12 and the second carbonized catalyst conduit 52 into the riser. In other words, the first regenerated catalyst conduit 12 and the second carbonized catalyst conduit 52 are azimuthal to openings 98a-c. Arcuate sections 94a and 94b may be narrower or wider than the inlet 15, 97 of a closest catalyst conduit 12, 52 into the riser 10.

As the first stream of regenerated catalyst enters into the space 96 from the regenerated catalyst conduit 12, it encounters arcuate section 94a and passes along arcuate section 94a of the wall 94 of the chamber 92 before the first stream of catalyst enters into an opening 98a, 98c or perhaps 98b after passing along arcuate section 94c or 94b. As the second stream of carbonized catalyst enters into the space 96 from the second carbonized catalyst conduit 52, it encounters arcuate section 94b and passes along arcuate section 94b of the wall of the chamber 92 before the second stream of catalyst enters into an opening 98b, 98c or perhaps 98a after passing along arcuate section 94a or 94c. The first stream of catalyst and the second stream of catalyst mix together inside of the chamber 92 and the first stream of catalyst and the second stream of catalyst exit the chamber 92 through the openings 98a-c in a mixed catalyst stream. The first stream of catalyst and the second stream of catalyst mix together in the space 96 and mix together in the chamber 92 to provide a mixture of catalyst in a mixed catalyst stream.

Turning back to FIG. 1, the chamber 92 has a closed top 102 which may comprise a hemispherical head that prevents catalyst from exiting upwardly through the top of the chamber 92 in alignment with the riser 10. The closed top 102 is disposed at an elevation about as high as the top of the enlarged lower section 11. The closed top 102 serves to reduce the cross sectional area of the enlarged lower section 11 to about half of the cross sectional area of the enlarged lower section 11 below the closed top 102 which includes the interior of the chamber 92. Consequently, the superficial velocity in the enlarged lower section 11 at the closed top is about twice the superficial velocity below the top in the enlarged cross sectional area. At least one, and preferably the plurality of openings 98 in the chamber 92 are spaced from the top 102. In an aspect, the openings 98 are spaced from a bottom 106 of the hemispherical head of the top 102 by a space that is at least a quarter of the diameter "D" of the chamber 92. The top 102 demarks an upper boundary between the chamber 92 and the riser 10.

It is anticipated that the chamber 92 be made of stainless steel such as 300 Series stainless steel and be lined with refractory. The edges of the openings 98 in the wall 94 may have a construction that prevents erosion. For example, the edges may be thicker than the rest of the wall 94. The edges may also be curved to deflect potentially eroding catalyst particles. Moreover, a weld bead may be welded to the edges to also resist erosion of the edges. Additionally, the chamber 92 may be made of or coated with a ceramic or other material that resists erosion.

Figure 3:
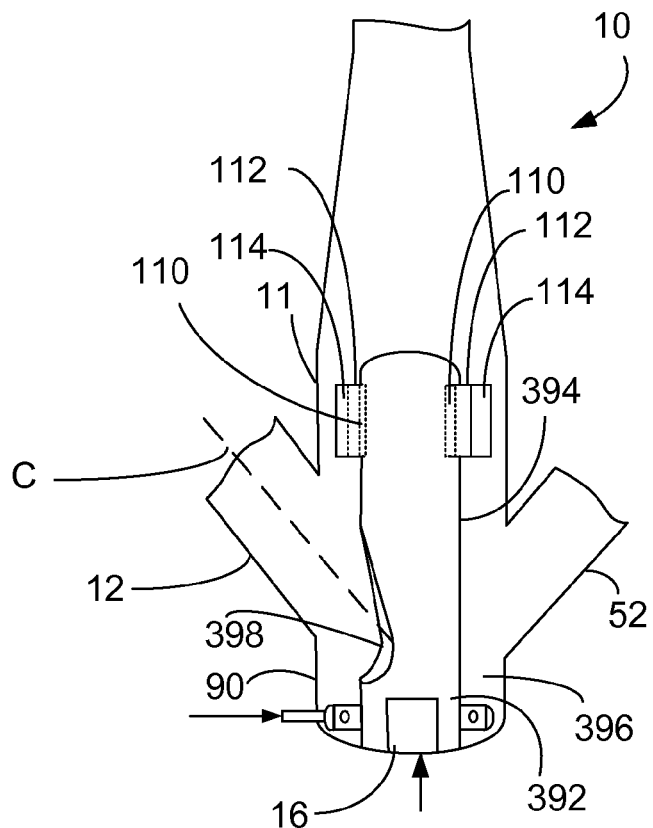
FIG. 3 is a partial, schematic, elevational view of the FCC unit of FIG. 1 incorporating an alternative embodiment of the present invention.

FIG. 3 illustrates a further embodiment of FIG. 1 with a different mixing chamber 392. Elements in FIG. 3 with the same configuration as in FIG. 1 will have the same reference numeral as in FIG. 1. Elements in FIG. 3 which have a different configuration as the corresponding element in FIG. 1 will have the same reference numeral but be preceded with the digit "3". Everything in FIG. 3 is the same as in FIG. 1 except the mixing chamber 392.

In FIG. 3, the chamber 392 is disposed in an enlarged lower section 11 of the riser 10. The first regenerated catalyst conduit 12 and the second carbonized catalyst conduit 52 deliver catalyst to a space 396 in the enlarged lower section 11 of the riser 10.

The chamber 392 in the riser 10 may communicate with the first regenerated catalyst conduit 12 and the second catalyst conduit 52. The chamber 392 may have an outer wall 394 that is spaced apart from an inner surface of the 90 wall of the enlarged lower section 11 of the riser 10. In an aspect, the chamber 392 is radially centered in the enlarged lower section 11 of the riser 10. The wall 394 of the chamber 392 and the wall 90 of the riser define a space 396 therebetween. In an aspect, the chamber 392 may comprise a cylindrical chamber 392 that defines an annular space 396 between the wall 394 of the chamber 392 and the wall 90 of the enlarged lower section 11. The first regenerated catalyst conduit 12 and the second carbonized catalyst conduit 52 may communicate with the space 396, so the first regenerated catalyst conduit 12 feeds the first stream of regenerated catalyst to the space 396 and the second carbonized catalyst conduit 52 feeds the second stream of carbonized catalyst to the space 396.

The chamber 392 includes an opening 398 in the wall 394 located in the space 396. The opening 398 serves as an entrance to and an exit from an interior of the chamber 392. Unlike in FIGS. 1 and 2, the opening 398 may be in alignment with the first catalyst conduit 12. Although the first regenerated catalyst conduit 12 is not connected to the chamber 392 through the opening 398, the first regenerated catalyst conduit has a longitudinal axis C that intersects the opening 398. The trajectory of first stream of regenerated catalyst exits the first regenerated catalyst conduit and is directed into the chamber 392 through the opening 398 in a manner that would be considered feeding even though the first regenerated catalyst conduit 12 and the chamber 392 are not connected. The chamber 392 may be in communication with the first regenerated catalyst conduit 12 and the second carbonized catalyst conduit 52, so at least a portion of the first stream of regenerated catalyst that misses the opening 398 and enters the space 396 and the second stream of carbonized catalyst may pass from the space 396 into the chamber 392 through the opening 398 in the chamber. The second carbonized catalyst conduit may not be in alignment with the opening 398, so the second stream of carbonized catalyst is not directed into the opening 398, but travels along the wall 394 and passes into opening 398 indirectly. It is contemplated that the second carbonized catalyst conduit 52 could be aligned with an additional opening in the wall 394 in an unshown embodiment.

The first stream of regenerated catalyst and the second stream of catalyst may pass from the chamber 392 back into the space 396 through the opening 398. By virtue of the first and second catalyst streams entering into and exiting the chamber through the opening 398 in the wall 394 of the chamber 392, the catalyst streams mix together to provide a mixed stream of catalyst with a more-homogeneous temperature throughout the mixed stream of catalyst.

The chamber 392 may have at least one additional exit opening 110. The at least one additional exit opening 110 may be in the vertical wall 394 and provide an inlet to an end of a tubular swirl arm 112 that has an outlet opening 114 at an opposite end of the swirl arm 112. The swirl arm 112 has a swirl-imparting configuration. The swirl-imparting configuration may be an arcuate tube that has a rectangular cross section. The chamber 394 may have at least two swirl arms 112 each with a respective exit opening 110. Two are shown in FIG. 3 with one opening 110 in phantom. Four swirl arms 112 are envisioned. The opening 398 in the wall 394 of the chamber 392 in upstream communication with the exit openings 110 and the swirl arms 112. The exit opening 110 may have a lower most portion that is disposed at an elevation above a lowermost portion, and preferably an upper most portion of the opening 398. Consequently, the catalyst entering the chamber 394 through the opening 398 travels upwardly to the exit opening 110. Fluidization gas from the distributor 16 propels catalyst entering the chamber 392 upwardly to the exit openings 110 and concomitant swirl arms 112. As the mixed stream of catalyst passes from the chamber 394 into the swirl arms 112, the arcuate configuration imparts a swirling motion to the mixed catalyst stream. The exit opening 110 and the swirl arm 112 may be configured tangentially to generate a swirling motion in the space 396 while the mixed stream of catalyst passes from the chamber 394 into the space 396. The swirling motion in the space serves to increase mixing in the space 396 and in the chamber 392. The first and second catalyst streams pass from the chamber into the riser and pass upwardly from the enlarged lower section 11 and are contacted with feed from feed distributors. Because the first regenerated catalyst conduit 12 is aligned with the opening 398, it is expected that most of the catalyst entering the chamber 392 will exit through the openings 110.

Figure 4:
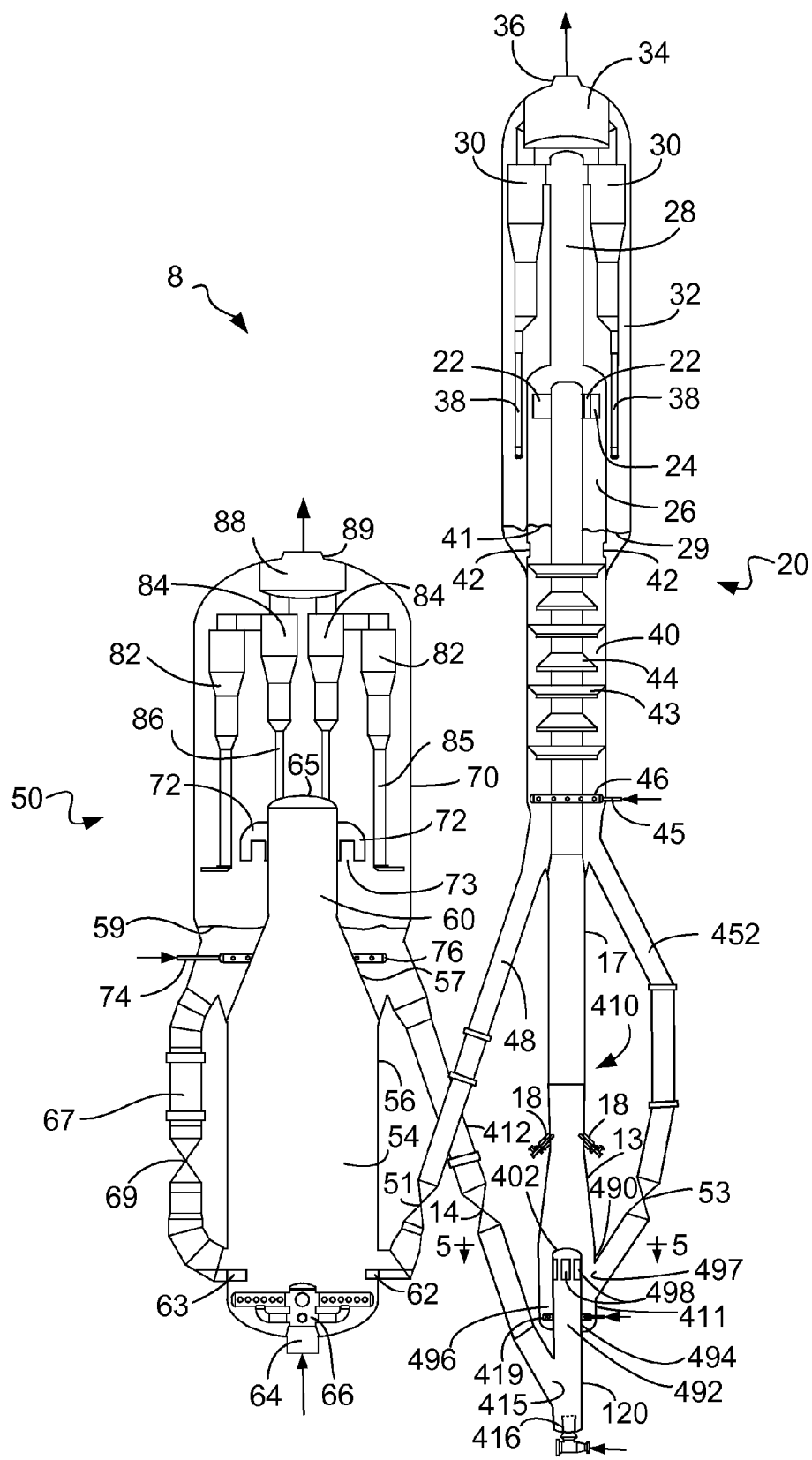
FIG. 4 is a schematic, elevational view of an alternative embodiment of the FCC unit of FIG. 1 incorporating an alternative embodiment of the present invention.

FIG. 4 illustrates an alternative embodiment in which the first regenerated catalyst stream from the first regenerated catalyst conduit 12 is fed into the chamber 492. In an aspect, the chamber 492 is in downstream communication only with the first regenerated catalyst conduit 412, and only the first stream of regenerated catalyst from conduit 412 is fed to the chamber 492. Elements in FIG. 4 with the same configuration as in FIG. 1 will have the same reference numeral as in FIG. 1. Elements in FIG. 4 which have a different configuration as the corresponding element in FIG. 1 will have the same reference numeral but be preceded with the digit "4" instead of digit "1".

In an embodiment shown in FIG. 4, an FCC unit 408 has a first regenerated catalyst conduit 412 and a second carbonized catalyst conduit 452 that are in upstream communication with a riser 410. The second carbonized catalyst conduit 452 connects to a riser 410 at an inlet 497. The riser 410 may comprise an enlarged lower section 411, a transition section 13 and a narrower upper section 17 as in FIG. 1. Fluidizing gas from a distributor 419 fluidizes catalyst in the lower section 411. The riser 410 is in downstream communication with the first catalyst conduit 412. The first regenerated catalyst conduit 412 feeds the first regenerated catalyst stream to a chamber 492 which extends into the enlarged lower section 411 of the riser 410. At least a portion of the chamber 492 is contained in the riser 410 and, in an aspect, in the enlarged lower section 411 of the riser 410. In an aspect, the chamber 492 in the riser 410 may be in downstream communication with the first regenerated catalyst conduit 412. The first regenerated catalyst conduit 412 may feed regenerated catalyst to the chamber 492 at an inlet 415 of the first regenerated catalyst conduit 412 to the chamber 492. The chamber 492 may include a sub-riser 120 that is connected to the first regenerated catalyst conduit 412. Consequently, the first regenerated catalyst conduit 412 feeds the first stream of regenerated catalyst into the chamber 492 at the sub-riser. Fluidizing gas from a distributor 416 in the sub-riser 120 fluidizes the first regenerated catalyst stream in the chamber 492 and lifts it upwardly in the chamber 492.

The second catalyst conduit 452 is in upstream communication with the riser 410. The second catalyst conduit 452 may connect to the lower section 411 of the riser 410 at a wall 490 of the lower section 411. In an aspect, the second catalyst conduit does not extend into the riser 410 past the wall 490 of the enlarged lower section 411. The chamber 492 may have an outer wall 494 that is spaced apart from an inner surface of the wall 490 of the enlarged lower section 411 of the riser 410. In an aspect, the chamber 492 is radially centered in the enlarged lower section 411 of the riser 410. In other words, although not shown, the chamber 492 has a central longitudinal axis aligned with a central longitudinal axis of the riser. In a further aspect, the outer wall 494 of the chamber 492 is a vertical wall.

The wall 494 of the chamber 492 and the wall 490 of the enlarged section 411 of the riser 410 are spaced apart to define a space 496. In an aspect, the enlarged lower section 411 may be cylindrical and the chamber 492 may comprise a cylindrical chamber 492 that define an annular space 496 between the wall 494 of the chamber 492 and the wall 490 of the enlarged lower section 411. The second carbonized catalyst conduit 452 may communicate with the space 496. The second carbonized catalyst conduit 452 feeds the second stream of carbonized catalyst to the riser 410 and in an aspect to the space 496 in the enlarged lower section 411 of the riser 410.

The first stream of catalyst may be passed from the chamber 492 into the space 496. The chamber 492 may have at least one exit opening 498. The opening 498 may be spaced apart from the wall 490 of the riser 410. The exit opening 498 may be in the vertical wall 494 of the chamber 492. In an aspect, upper most portions of openings 498 may be at an elevation above a lower most portion, and preferably an upper most portion, of the inlet 415. Hence, the first stream of regenerated catalyst may pass upwardly from the inlet 415 of the first catalyst conduit 412 into the chamber 492 to the openings 498.

The first catalyst stream may pass from the opening 498 in the chamber 492 into the riser 10 and mixes with the second carbonized catalyst stream. In an aspect, the first catalyst stream passes from an opening 498 in the chamber 492 into the enlarged lower section 411 of the riser 410 in and mixes with the second carbonized catalyst stream fed to the enlarged lower section 411 by the carbonized catalyst conduit 452. In an aspect, the first regenerated catalyst stream and the second carbonized catalyst stream mix in the space 496. The mixture of the first regenerated catalyst stream and the second carbonized catalyst stream pass upwardly into the riser from the enlarged lower section 411 and are contacted with feed from feed distributors 18. Because the regenerated catalyst stream will be exiting the openings 498 propelled by fluidizing gas from distributor 416 very little if any of the second carbonized catalyst will enter the chamber 492 through the opening 498. Consequently, the second carbonized catalyst conduit 452 is out of communication with the chamber 492, and the second carbonized catalyst stream is not passed into the chamber 492. The chamber 492 has a top 402 to prevent the first regenerated catalyst stream from exiting the chamber 492 upwardly in alignment with the riser 410. The top 402 demarks an upper boundary between the chamber 492 and the riser 10.

Figure 5A:
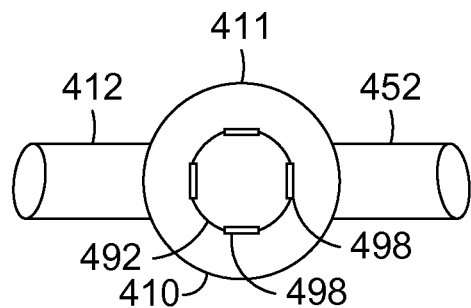
FIGS. 5a, 5b and 5c are sectional views of FIG. 4 taken at segment 5-5.

FIG. 5a shows a plan sectional view of segment 5-5 taken in FIG. 4. FIG. 5a shows the first regenerated catalyst conduit 412 and the second carbonized catalyst conduit 452 in upstream communication with the lower section 411 of the riser 410. Openings 498 constitute windows in the chamber 492.

Figure 5B:
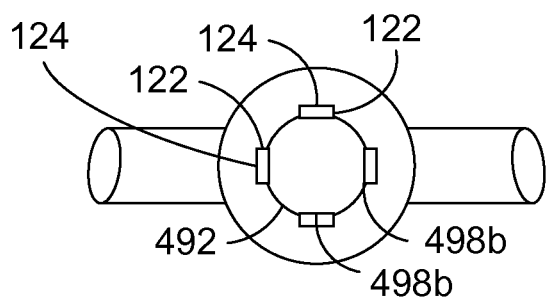

FIG. 5b shows an alternative plan sectional view of segment 5-5 taken in FIG. 4 in which each opening 498b is on an inlet end of a stub tube 122 that may have a rectangular or other cross section. The stub tube has an opening 124 on an outlet end that provides communication between an interior of the chamber 492 and the space 496.

Figure 5C:
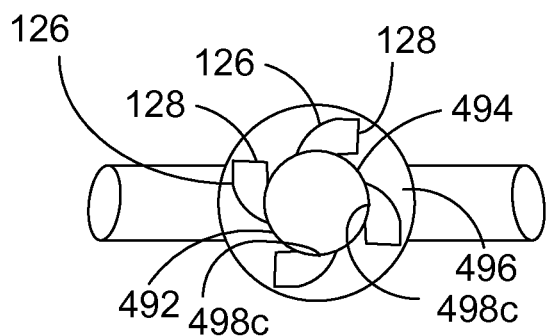

FIG. 5c shows another, alternative plan sectional view of segment 5-5 taken in FIG. 4 in which each opening 498c is an inlet at an end of a swirl tube 126 that may have a rectangular cross section. The swirl tube has an open outlet end 128 that provides communication between an interior of the chamber 492 and the space 496. The swirl-imparting configuration may be an arcuate tube. An opening in a wall 494 of the chamber 492 is in upstream communication with the swirl arm 124. As the first stream of regenerated catalyst passes from the chamber 492 into the swirl arm 124 the arcuate configuration imparts a swirling motion to the first catalyst stream while it passes from the chamber 494 into the space 496 through openings 498c. The swirling motion in the space serves to increase mixing of the first stream of regenerated catalyst and the second stream of carbonized catalyst in the space 496. The chamber 494 may have at least two swirl arms 124 each with a respective exit opening 498c. Four swirl arms 124 are shown in FIG. 5c each with respective exit openings 498c.

Figure 6:
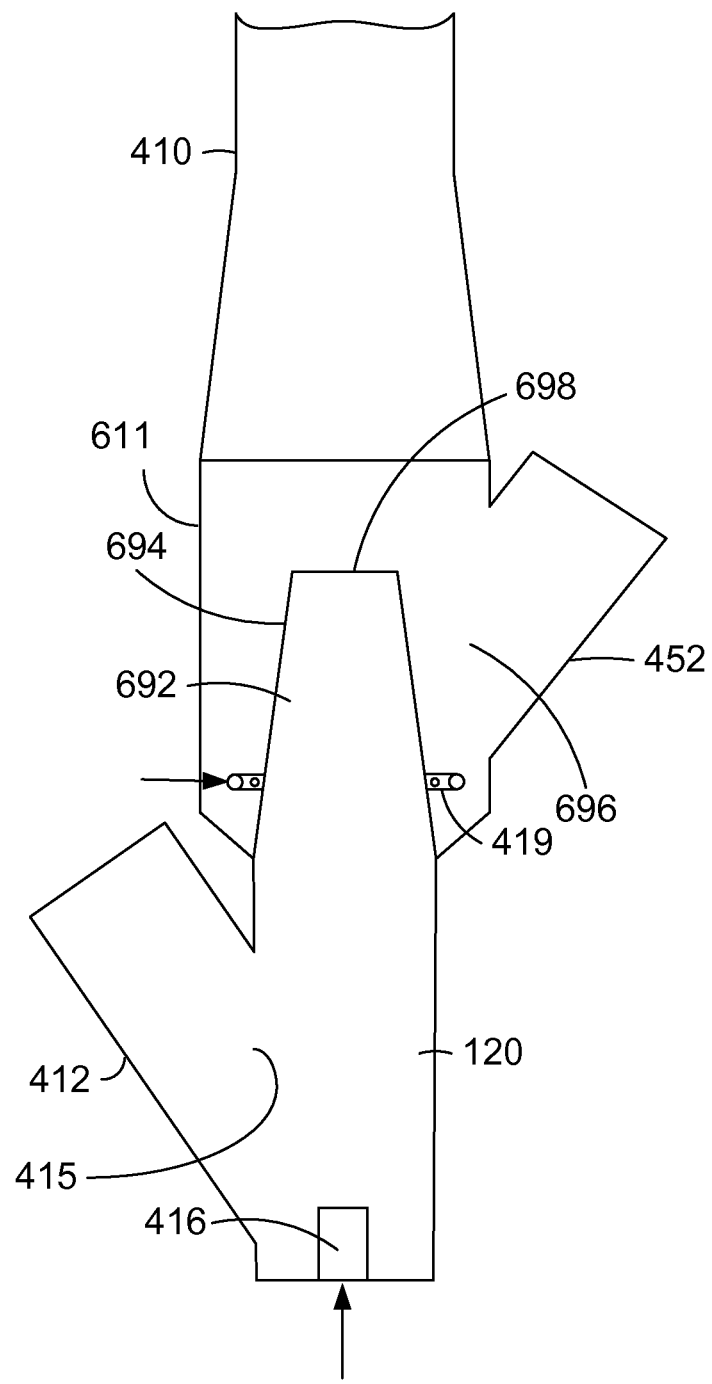
FIG. 6 is a partial, schematic, elevational view of the FCC unit of FIG. 4 incorporating an alternative embodiment of the present invention.

FIG. 6 illustrates an alternative embodiment of FIG. 4 in which a chamber 692 has an open top. In this embodiment, the first regenerated catalyst stream from the first regenerated catalyst conduit 412 is fed into the chamber 692 at an inlet 415 of the first regenerated catalyst conduit 412 to the chamber 692. The chamber 692 is in downstream communication only with the first regenerated catalyst conduit 412, not the second carbonized catalyst conduit 452. Elements in FIG. 6 with the same configuration as in FIG. 4 will have the same reference numeral as in FIG. 4. Elements in FIG. 6 which have a different configuration as the corresponding element in FIG. 4 will have the same reference numeral but be preceded with the digit "6"" which will replace the digit "4" in most cases.

The embodiment of FIG. 6 has generally the same configuration as the embodiment of FIG. 4. The first regenerated catalyst conduit 412 feeds catalyst to the chamber 692 and the second carbonized catalyst conduit 452 feeds catalyst to a space 696. The chamber 692 has a frustoconical wall 694 above the sub-riser 120 to provide a venturi device. The first stream of regenerated catalyst propelled upwardly by fluidizing gas from distributor 416 is accelerated as it exits an opening 698 from the chamber 692 because the opening 698 is narrowed due to the gradually decreasing inner diameter ascending in the chamber 692. The accelerated first stream of regenerated catalyst provides an eductor effect to improve mixing with the second stream of carbonized catalyst entrained upwardly in the space 696 by fluidizing gas from distributor 419 and by the eductor effect of the first stream of regenerated catalyst exiting the opening 698 under acceleration. The mixed stream of catalyst travels upwardly in the riser 410 to be contacted with feed. In an aspect, opening 698 may be at an elevation above a lower most portion, and preferably an upper most portion, of the inlet 415. Hence, the first stream of regenerated catalyst may pass upwardly from the inlet 415 of the first catalyst conduit 412 into the chamber 692 to the opening 698. The opening 698 demarks an upper boundary between the chamber 692 and the riser 410.

Figure 7:
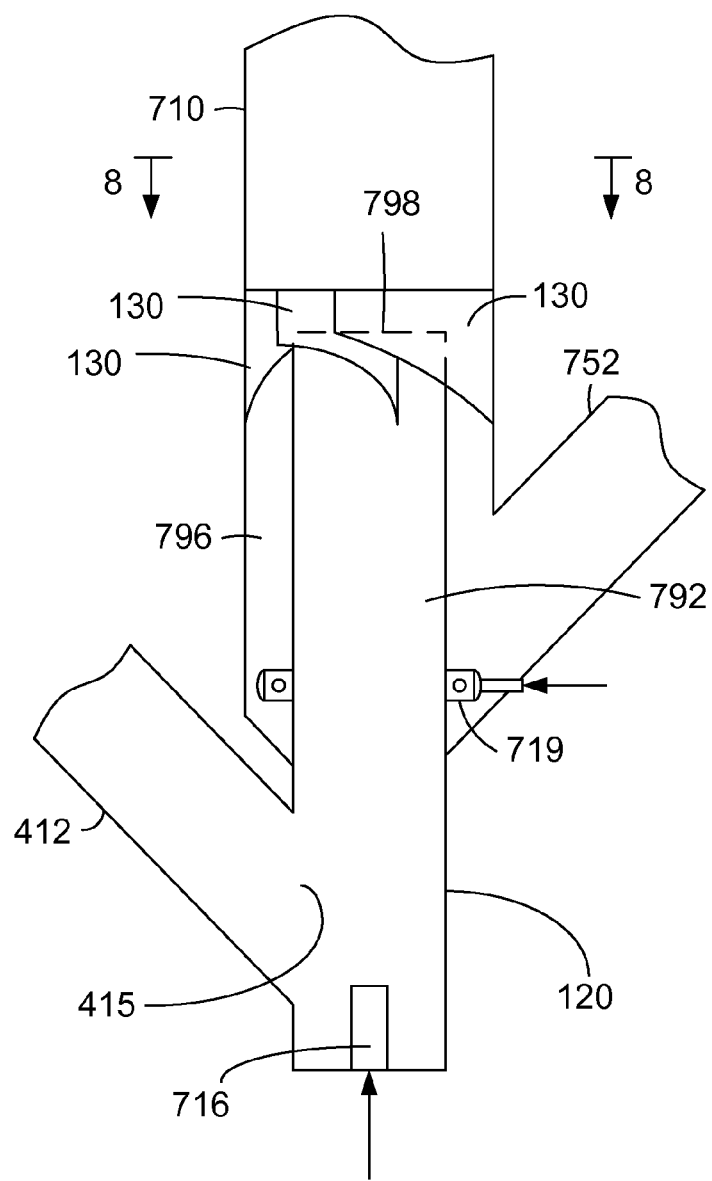
FIG. 7 is a partial, schematic, elevational view of the FCC unit of FIG. 4 incorporating an alternative embodiment of the present invention.
Figure 8:
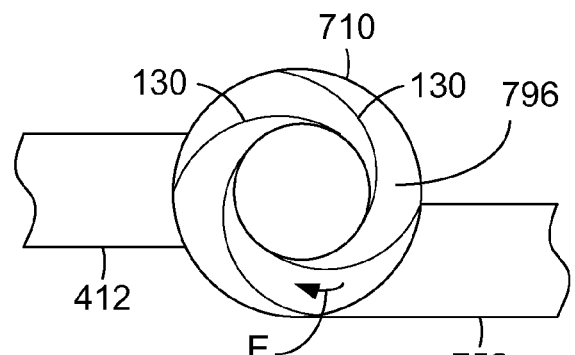
FIG. 8 is a sectional view of FIG. 7 taken at segment 8-8.

FIGS. 7 and 8 illustrate an alternative embodiment of FIG. 4 in which the chamber 792 also has an open top. FIG. 8 is a plan sectional view of segment 8-8 taken in FIG. 7. In this embodiment, the first regenerated catalyst stream from the first regenerated catalyst conduit 412 is fed into a chamber 792 which is in downstream communication only with the first regenerated catalyst conduit 412, not a second carbonized catalyst conduit 752. Elements in FIG. 7 with the same configuration as in FIG. 4 will have the same reference numeral as in FIG. 4. Elements in FIG. 7 which have a different configuration as the corresponding element in FIG. 4 will have the same reference numeral but be preceded with the digit "7" which will replace the digit "4" in most cases.

The embodiment of FIG. 7 has a generally similar configuration as the embodiment of FIG. 4. A riser 710 in FIG. 7 is not shown to have an enlarged lower section 411 but it may. The first regenerated catalyst conduit 412 feeds catalyst to the chamber 792 and a second carbonized catalyst conduit 752 feeds catalyst to a space 796. The chamber is fluidized by fluidizing gas from a distributor 716 and the riser 710 is fluidized by fluidizing gas from distributor 719.

It can be seen in FIG. 8 that the second carbonized catalyst conduit 752 may be tangentially arranged with respect to the riser so as to give the carbonized catalyst a angular component upon entering the riser 710. Swirl vanes 130 are arranged in the space 796 to further impart angular momentum to the carbonized catalyst in agreement with the tangential arrangement of the second carbonized catalyst conduit 752. Arrow "E" shows the angular direction in which catalyst is induced to swirl by swirl vanes 130 and the tangentially connected second carbonized catalyst conduit 752. The first regenerated catalyst conduit 412 is radially arranged with respect to the sub-riser 120 of the chamber 792.

The chamber 792 has an opening 798 at its top, so the first regenerated catalyst stream may exit the opening upwardly in alignment with the riser 710. The space 796 includes swirl vanes 130 between the wall 790 of the riser 710 and the wall 794 of the chamber 792 adjacent to the opening 798. The top of the chamber 792 is shown in phantom because it is hidden behind the vanes 130. A plurality of swirl vanes 130 may be installed each having a helical configuration to impart angular momentum to catalyst exiting therethrough. The swirl vanes 130 may have an upper end that extends above the opening 798 at the top of the chamber 792. As the second stream of carbonized catalyst ascends from the space 796 to the riser 710 above the chamber 792 pushed upwardly therethrough by fluidizing gas from distributor 719, the swirl vanes 130 impart further angular momentum to the carbonized catalyst. The second stream of carbonized catalyst may flow through the vanes at a velocity in the range of about 1 m/s (3 ft/s) to about 9.2 m/s (30 ft/s) and flux in range of about 244 kg/m$^2$/s (50 lb/ft$^2$/s) to 1464 kg/m$^2$/s (300 lb/ft2/sec). The high flux, swirling second stream of carbonized catalyst mixes with the first stream of regenerated catalyst exiting the chamber 792 through opening 798 propelled by fluidizing gas from the distributor 716. The mixed stream of catalyst travels upwardly in the riser 710 to be contacted with hydrocarbon feed. In an aspect, the opening 798 may be at an elevation above a lower most portion, and preferably an upper most portion, of the inlet 415. Hence, the first stream of regenerated catalyst may pass upwardly from the inlet 415 of the first catalyst conduit 412 into the chamber 492 to the opening 798. The opening 798 demarks an upper boundary between the chamber 792 and the riser 710.

Figure 9:
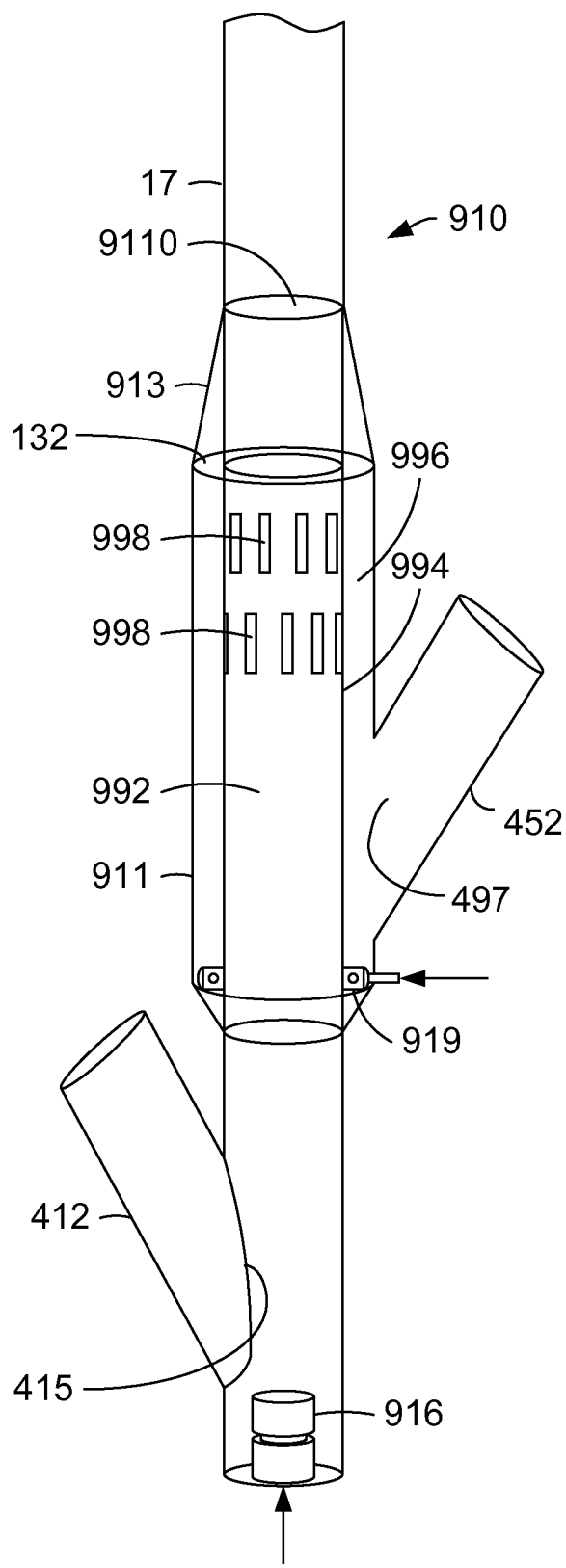
FIG. 9 is a partial, schematic, elevational view of the FCC unit of FIG. 4 incorporating an alternative embodiment of the present invention.

FIG. 9 illustrates an alternative embodiment of FIG. 4 in which the chamber 492 has an open top and the second stream of carbonized catalyst enters into the chamber. Elements in FIG. 9 with the same configuration as in FIG. 4 will have the same reference numeral as in FIG. 4. Elements in FIG. 9 which have a different configuration as the corresponding element in FIG. 4 will have the same reference numeral but be preceded with the digit "9" instead of the digit "4" in most cases.

The embodiment of FIG. 9 has a similar configuration as the embodiment of FIG. 4. The first regenerated catalyst conduit 412 feeds catalyst to a chamber 992 at inlet 415 and the second carbonized catalyst conduit 452 feeds catalyst to a space 996 in enlarged lower section 911 of the riser 910 at inlet 497. The first regenerated catalyst stream from the first regenerated catalyst conduit 412 is fed into the chamber 992 which is in downstream communication only with the first regenerated catalyst conduit 412. The chamber 992 may extend upwardly through an entire enlarged lower section 911. However, a baffle 132 may prevent catalyst from ascending in the space 996 adjacent to the frustoconical transition section 913 of the riser 910. Openings 998 in a wall 994 of the chamber 992 allow the second stream of carbonized catalyst to enter into the chamber 992. Consequently, the chamber 992 is in downstream communication with the second carbonized catalyst conduit 452. The second carbonized catalyst conduit 452 feeds the second carbonized catalyst stream to the space 996. The second carbonized catalyst stream passes along the wall 994 of the chamber 992 until it passes from the space 996 through openings 998 into the chamber 992 impelled by fluidizing gas from distributor 919. The second carbonized catalyst stream may enter the chamber 992 through openings 998 at a velocity in the range of about 1 m/s (3 ft/s) to about 9.2 m/s (30 ft/s) and flux in range of about 244 kg/m²/s (50 lb/ft²/s) to 1464 kg/m²/s (300 lb/ft2/sec). The first stream of regenerated catalyst mixes with the second stream of carbonized catalyst in the chamber 992. The mixed stream of catalyst exits the opening 9110 in the chamber 992 and enters the upper section 17 of the riser 910. The mixed stream of catalyst then travels upwardly in the riser 910 to be contacted with feed. In an aspect, the opening 9110 may be at an elevation above a lower most portion, and preferably an upper most portion, of the inlet 415. Hence, the first stream of regenerated catalyst may pass upwardly from the inlet 415 of the first catalyst conduit 412 into the chamber 492 to the opening 9110. In another aspect, the openings 998 may be at an elevation above a lower most portion, and preferably an upper most portion, of an inlet 497 of the second carbonized catalyst conduit 452 to the riser 910. As a result, the second stream of carbonized catalyst may pass upwardly from the second catalyst conduit 452 into the chamber 992 through space 996. The opening 9110 demarks an upper boundary between the chamber 992 and the riser 910.

Figure 10:
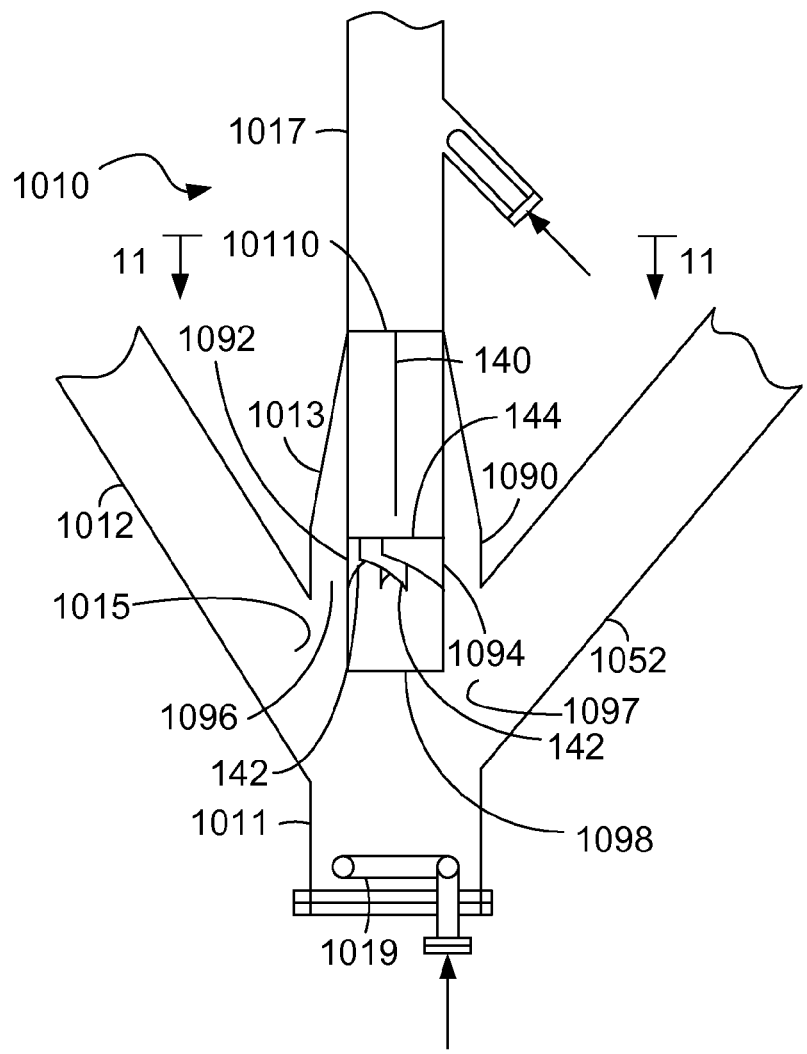
FIG. 10 is a partial, schematic, elevational view of the FCC unit of FIG. 4 incorporating an alternative embodiment of the present invention.
Figure 11:
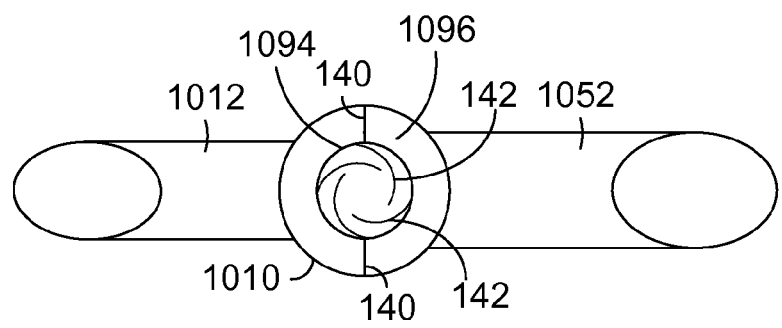
FIG. 11 is a sectional view of FIG. 10 taken at segment 11-11.

FIGS. 10 and 11 illustrate a further alternative embodiment of FIG. 4 in which a chamber 1092 extends from an enlarged lower section 1011 of a riser 1010, through a transition section 1013 and ascends to an upper section 1017. FIG. 11 is a plan sectional view of segment 11-11 taken in FIG. 10. Elements in FIG. 10 with the same configuration as in FIG. 4 will have the same reference numeral as in FIG. 4. Elements in FIG. 10 which have a different configuration as the corresponding element in FIG. 4 will have the same reference numeral but be preceded with the digit "10".

The embodiment of FIG. 10 has a similar configuration as the embodiment of FIG. 4. The first regenerated catalyst stream from the first regenerated catalyst conduit 1012 through the inlet 1015 and the second carbonized catalyst stream from the second carbonized catalyst conduit 1052 through the inlet 1097 fluidized by gas from distributor 1019 mix in the enlarged lower section 1011 of the riser 1010 and both streams enter into the chamber 1092 through an opening 1098 in the bottom of the chamber 1092 to be mixed further. In an aspect, the opening 1098 in the chamber 1092 is not in a vertical wall 1094 but may be in a bottom of the chamber 1092. The chamber 1092 extends from the enlarged lower section 1011 to the upper section 1017 of the riser 1010. The wall 1094 of the chamber 1092 is spaced from a wall 1090 of the enlarged lower section 1011 to provide a space 1096.

Fluidizing gas from distributor 1019 impels the first regenerated catalyst stream and the second carbonized catalyst stream to pass upwardly in the lower section 1011 from the first regenerated catalyst conduit 1012 and the second carbonized catalyst conduit 1052, respectively, into the chamber 1092.

At least one helical swirl vane 142 in the chamber 1092 imparts an angular momentum to the mixture of the first regenerated catalyst stream and the second carbonized catalyst stream as they travel up through the chamber 1092 to further mix the two streams into a mixed catalyst stream. The swirl vane may be placed anywhere along the height of the chamber 1092, but FIG. 10 shows it in the enlarged lower section 1011 before the transition section 1013.

FIGS. 10 and 11 together show at least one baffle 140 in the space 1096 between the wall 1090 of the riser 1010 and the wall 1094 of the chamber 1092. The at least one baffle 140 prevents commingling of first stream of regenerated catalyst and the second stream of carbonized catalyst in a potentially stagnant annular region above the entrances of the first regenerated catalyst conduit 1012 and the second carbonized catalyst conduit 1052 to the enlarged lower section 1011 of the riser 1010, thus preventing calcination of the coke on the carbonized catalyst that may be caught in the stagnant region. Alternatively, a baffle (not shown) may prevent any material from ascending in the space 1096 in the transition section 1013 or the riser 1010 may be fashioned without some or all of the transition section 1013.

In this embodiment, the first regenerated catalyst stream from the first regenerated catalyst conduit 1012 and the second carbonized catalyst stream from the second carbonized catalyst conduit 1052 are both passed to the chamber 1092. The first regenerated catalyst conduit 1012 and the second carbonized catalyst conduit 1052 are both in upstream communication with the enlarged lower section 1011 of the riser 1010 and the chamber 1092. The first regenerated catalyst conduit 1012 feeds the first regenerated catalyst stream through inlet 1015 and the second carbonized catalyst conduit 1052 feeds the second carbonized catalyst stream through the inlet 1097 to the enlarged lower section 1011 of the riser 1010 and to a space 1096 between a wall 1090 of the enlarged lower section 1011 of the riser 1010 and the wall 1094 of the chamber 1092. In an aspect, the opening 1098 may be at an elevation above a lower most portion of the inlet 1015. In another aspect, the opening 1098 may be at an elevation above a lower most portion of an inlet 1097 of the second carbonized catalyst conduit 1052 to the riser 1010. Hence, the first stream of regenerated catalyst may pass upwardly from the inlet 1015 of the first catalyst conduit 1012 and the second stream of carbonized catalyst may pass upwardly from the inlet 1097 of the second catalyst conduit 1052 to the opening 1098 into the chamber 1092.

The first regenerated catalyst stream and the second carbonized catalyst stream pass into the chamber 1092 from the space 1096 and the enlarged lower section 1011 of the riser 1010 Consequently, the chamber 1092 is in downstream communication with the first regenerated catalyst conduit 1012 and the second carbonized catalyst conduit 1052. The first stream of regenerated catalyst mixes with the second stream of carbonized catalyst in the enlarged lower section 1011 and mix further in the chamber 1092 due to the angular momentum imparted to the catalyst streams upon passing the at least one and preferably a plurality of swirl vanes 142. The mixed catalyst stream exits an opening 10110 in a top of the chamber 1092 and enters the upper section 1017 of the riser 1010. The mixed stream of catalyst then travels upwardly in the riser 1010 to be contacted with feed. The opening 10110 demarks an upper boundary between the chamber 1092 and the riser 1010. Alternatively, tops 144 of the swirl vanes 142 may be viewed as an upper boundary of the chamber 1092.

EXAMPLE

We conducted Computational Fluid Dynamics modeling to determine performance of different embodiments of the present invention. The first regenerated catalyst stream was devoid of coke, had a catalyst flow rate of 8,647,893 kg/h (19,065,343 lb/hr), a gas flow rate of 11,674 kg/hr (25,738 lb/hr) and a temperature of 742° C. (1,367° F.). The second carbonized catalyst stream was fully coked indicating a coke concentration of 0.858 wt-% of catalyst, also had a catalyst flow rate of 8,647,893 kg/h (19,065,343 lb/hr), a gas flow rate of 10,810 kg/hr (23,833 lb/hr) and a temperature of 549° C. (1,020° F.). The catalyst and gas properties in Table I were also utilized in the model.

TABLE I

| Property | Metric | English |
| --- | --- | --- |
| Catalyst Density | 1442 kg/m³ | 90 lb/ft³ |
| Gas Density | 1.041 kg/m³ | 0.065 lb/ft³ |
| Gas Viscosity | 0.014 cP | |
| Gas Conductivity | 0.024 W/m-K | 0.014 Btu/h-ft-° F. |
| Catalyst Conductivity | 0.100 W/m-K | 0.58 Btu/h-ft-° F. |
| Gas Heat Capacity | 1004.83 J/kg-K | 0.24 Btu/lb-° F. |
| Catalyst Heat Capacity | 1151.370 J/kg-K | 0.275 Btu/lb-° F. |

For the embodiments in FIGS. 1, 2 and 3, the fluidizing steam rate was 69,638 kg/hr (153,525 lb/hr) from the single distributor 16. For the embodiments in FIGS. 4, 5c; 6; 7, 8 and 9, 6.1 wt-% or 4,535 kg/hr (10,000 lb/hr) of the steam from distributor 416, 716, 916 was diverted to the top distributor 419, 719, 919 to fluff the enlarged lower section 11 of the riser 10. The steam temperature was 154° C. (310° F.).

Based on these parameters, modeling indicated the embodiments of the invention would yield the temperature differentials as reported in Table II.

TABLE II

| | Figure(s) Illustrating Embodiment | | | | | |
| --- | --- | --- | --- | --- | --- | --- |
| | 1, 2 | 3 | 4, 5c | 6 | 7, 8 | 9 |
| Temperature Differential, ° C. (° F.) | 4 (7) | 0.8 (1.5) | 13.6 (24.5) | 119 (214) | 76 (136) | 29 (53) |

Temperature differential was calculated at a location in the riser 10, 1 meter (3.3 feet) below the feed distributors 18, which in the modeled riser 10 was in the upper riser 17 above the transition section 13. The temperature differential represents the maximum temperature spread for the catalyst, typically the difference of the hottest regenerated catalyst and the coolest carbonized catalyst. The embodiments in FIGS. 1, 2 and 3 showed the best performance in terms of catalyst mixing which produced essentially homogeneous catalyst temperature.

Preferred embodiments of this invention are described herein, including the best mode known to the inventors for carrying out the invention. It should be understood that the illustrated embodiments are exemplary only, and should not be taken as limiting the scope of the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated. Pressures are given at the vessel outlet and particularly at the vapor outlet in vessels with multiple outlets.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for mixing two streams of catalyst comprising:
   feeding a first stream of catalyst to a chamber;
   feeding a second stream of catalyst to a riser;
   said chamber being in said riser;
   passing catalyst from said chamber into said riser;
   passing said first stream of catalyst and said second stream of catalyst up said riser; and
   injecting a hydrocarbon feed into the riser.

2. The process of claim 1 further comprising passing said second stream of catalyst to said chamber.

3. The process of claim 1 further comprising feeding said second stream of catalyst to a space between a wall of said riser and a wall of said chamber.

4. The process of claim 3 further comprising passing said second stream of catalyst from said space into said chamber.

5. The process of claim 4 further comprising passing said second stream of catalyst from said space into said chamber through an opening in said chamber.

6. The process of claim 5 further comprising feeding said second stream of catalyst to said space, passing said second stream of catalyst along a wall of said chamber and into said opening in said chamber.

7. The process of claim 5 further comprising passing said second stream of catalyst from said chamber into said space.

8. The process of claim 1 further comprising passing said first stream of catalyst from said chamber into a space between a wall of said riser and a wall of said chamber.

9. The process of claim 8 further comprising passing said second stream of catalyst from said chamber into said space.

10. The process of claim 8 further comprising passing said second stream of catalyst from said space into said chamber.

11. The process of claim 8 further comprising imparting a swirling motion to said first stream of catalyst as it passes from said chamber into said space.

12. The process of claim 1 wherein only said first stream of catalyst is fed to said chamber.

13. The process of claim 12 further comprising passing said first stream of catalyst from said chamber into a space between a wall of said riser and a wall of said chamber.

14. The process of claim 13 further comprising passing said second stream of catalyst to said space.

15. The process of claim 1 further comprising feeding said second stream of catalyst to said chamber and imparting a swirl motion to said first catalyst stream and said second catalyst stream in said chamber.

16. A process for mixing two streams of catalyst comprising:
   passing a first stream of catalyst upwardly from a first catalyst conduit into a chamber;
   feeding a second stream of catalyst to a space between a wall of a riser and a wall of said chamber;
   said chamber being in said riser;
   passing catalyst from said chamber into said riser;
   passing said first stream of catalyst and said second stream of catalyst up said riser; and
   injecting a hydrocarbon feed into the riser.

17. The process of claim 16 further comprising passing said second stream of catalyst from said space into said chamber.

18. A process for mixing two streams of catalyst comprising feeding a first stream of catalyst to a chamber;
   feeding a second stream of catalyst to a space between a wall of a riser and a wall of said chamber;
   said chamber being in said riser;
   passing said first stream of catalyst from said chamber into said space;
   passing said first stream of catalyst and said second stream of catalyst up said riser; and
   injecting a hydrocarbon feed into the riser.

19. The process of claim 18 wherein only said first stream of catalyst is fed to said chamber.

\* \* \* \* \*